United States Patent
Tietjen et al.

(10) Patent No.: US 11,200,217 B2
(45) Date of Patent: Dec. 14, 2021

(54) STRUCTURED DOCUMENT INDEXING AND SEARCHING

(71) Applicant: PERFECT SEARCH CORPORATION, Orem, UT (US)

(72) Inventors: Bruce R. Tietjen, Cedar Hills, UT (US); Ronald P. Millett, Cedar Hills, UT (US)

(73) Assignee: PERFECT SEARCH CORPORATION, Orem, UT (US)

( * ) Notice: Subject to any disclaimer, the term of this patent is extended or adjusted under 35 U.S.C. 154(b) by 602 days.

(21) Appl. No.: 15/607,058

(22) Filed: May 26, 2017

(65) Prior Publication Data

US 2017/0344548 A1    Nov. 30, 2017

Related U.S. Application Data

(60) Provisional application No. 62/342,072, filed on May 26, 2016.

(51) Int. Cl.
| | |
|---|---|
| *G06F 15/16* | (2006.01) |
| *G06F 16/22* | (2019.01) |
| *G06F 16/93* | (2019.01) |
| *G06F 16/245* | (2019.01) |

(52) U.S. Cl.
CPC ........ *G06F 16/2255* (2019.01); *G06F 16/245* (2019.01); *G06F 16/93* (2019.01)

(58) Field of Classification Search
CPC combination set(s) only.
See application file for complete search history.

(56) References Cited

U.S. PATENT DOCUMENTS

| | | | |
|---|---|---|---|
| 4,817,036 A | 3/1989 | Millett et al. |
| 4,961,139 A | 10/1990 | Hong et al. |
| 5,530,854 A | 6/1996 | Emery et al. |
| 5,664,179 A | 9/1997 | Tucker |
| 5,699,441 A | 12/1997 | Sagawa |

(Continued)

FOREIGN PATENT DOCUMENTS

| | | |
|---|---|---|
| WO | WO2002010967 | 2/2002 |
| WO | WO2007082212 | 7/2007 |
| WO | WO2007103815 | 9/2007 |

OTHER PUBLICATIONS

"Efficient Phrase Querying with an Auxiliary Index," SIGIR '02 Proceedings of the 25th annual international ACM SIGIR conference on Research and development in information retrieval, ACM, New York, NY, pp. 215-221, 2002.

(Continued)

*Primary Examiner* — Alex Gofman
(74) *Attorney, Agent, or Firm* — Workman Nydegger

(57) ABSTRACT

A method includes searching for data contained in a structured data structure. The method includes receiving a query. The query includes a structured data structure path and a first element related to the structured data structure path. One or more patterns are created comprising at least a portion of the structured data structure path and one or more elements related to the first element. For each of the one or more patterns, a hash is created. The created hashes are looked-up in a hash index to identify one or more structured data structures correlated to the hashes. The one or more structured data structures are identified to a user.

14 Claims, 5 Drawing Sheets

Data Indexing System 100

(56) References Cited

U.S. PATENT DOCUMENTS

| | | | |
|---|---|---|---|
| 5,701,459 A | 12/1997 | Millett et al. |
| 5,737,734 A | 4/1998 | Schultz |
| 5,740,445 A | 4/1998 | Okuda |
| 5,761,652 A | 6/1998 | Wu et al. |
| 5,799,312 A | 8/1998 | Rigoutsos |
| 5,852,822 A | 12/1998 | Srinivasan et al. |
| 5,960,194 A | 9/1999 | Choy et al. |
| 6,018,733 A | 1/2000 | Kirsch et al. |
| 6,026,398 A | 2/2000 | Brown et al. |
| 6,070,164 A | 5/2000 | Vagnozzi |
| 6,076,051 A | 6/2000 | Messerly |
| 6,128,613 A | 10/2000 | Wong et al. |
| 6,216,213 B1 | 4/2001 | Robertson et al. |
| 6,233,571 B1 | 5/2001 | Egger et al. |
| 6,253,188 B1 | 6/2001 | Witek |
| 6,473,729 B1 | 10/2002 | Gastaldo et al. |
| 6,516,320 B1 | 2/2003 | Odom et al. |
| 6,658,626 B1 | 2/2003 | Aiken |
| 6,584,458 B1 | 6/2003 | Millett et al. |
| 6,584,465 B1 | 6/2003 | Zhu |
| 6,678,686 B1 | 1/2004 | Patel |
| 6,718,325 B1 | 4/2004 | Chandra |
| 6,748,401 B2 | 6/2004 | Blackburn et al. |
| 6,772,141 B1 | 8/2004 | Pratt et al. |
| 6,778,981 B2 | 8/2004 | Lee et al. |
| 6,785,677 B1 | 8/2004 | Fritchman |
| 6,804,664 B1 | 10/2004 | Hailiuan et al. |
| 6,879,976 B1 | 4/2005 | Brookler et al. |
| 6,938,046 B2 | 8/2005 | Cooke et al. |
| 6,947,931 B1 | 9/2005 | Bass et al. |
| 6,985,904 B1 | 1/2006 | Kaluskar et al. |
| 6,993,533 B1 | 1/2006 | Barnes |
| 7,139,753 B2 | 11/2006 | Bass et al. |
| 7,181,438 B1 | 2/2007 | Szabo |
| 7,266,553 B1 | 9/2007 | Anderson |
| 7,296,011 B2 | 11/2007 | Chaudhuri et al. |
| 7,328,211 B2 | 2/2008 | Bordner et al. |
| 7,590,716 B2 | 9/2009 | Sinclair et al. |
| 7,640,363 B2 | 12/2009 | Teodosiu |
| 8,214,210 B1* | 7/2012 | Woods | G10L 15/08 704/236 |
| 2002/0099536 A1 | 7/2002 | Bordner et al. |
| 2002/0099685 A1 | 7/2002 | Takano |
| 2002/0103799 A1 | 8/2002 | Bradford |
| 2003/0191737 A1 | 10/2003 | Steele |
| 2004/0225643 A1 | 10/2004 | Alpha et al. |
| 2004/0225497 A1 | 11/2004 | Callahan |
| 2004/0260694 A1 | 12/2004 | Chaudhuri et al. |
| 2005/0022017 A1 | 1/2005 | Maufer et al. |
| 2005/0055334 A1* | 3/2005 | Krishnamurthy | G06F 16/30 |
| 2005/0076010 A1 | 4/2005 | Bass et al. |
| 2005/0086215 A1* | 4/2005 | Perisic | G06F 16/9535 |
| 2005/0108230 A1 | 5/2005 | Carroll |
| 2005/0108394 A1 | 5/2005 | Braun et al. |
| 2005/0131872 A1 | 6/2005 | Calbucci et al. |
| 2005/0171926 A1 | 8/2005 | Ne |
| 2005/0283468 A1 | 12/2005 | Kamvar |
| 2005/0289138 A1* | 12/2005 | Cheng | G06F 16/81 |
| 2006/0004740 A1* | 1/2006 | Dettinger | G06F 16/2423 |
| 2006/0036649 A1 | 2/2006 | Simske et al. |
| 2006/0080361 A1 | 4/2006 | Suzuki |
| 2006/0106793 A1 | 5/2006 | Liang |
| 2006/0126916 A1 | 6/2006 | Kokumai |
| 2006/0195672 A1 | 8/2006 | Inoue et al. |
| 2006/0212420 A1 | 9/2006 | Murthy |
| 2006/0235843 A1 | 10/2006 | Musgrove et al. |
| 2006/0265396 A1 | 11/2006 | Raman et al. |
| 2007/0011183 A1* | 1/2007 | Langseth | G06F 16/313 |
| 2007/0016602 A1 | 1/2007 | McCool et al. |
| 2007/0027864 A1 | 2/2007 | Collins et al. |
| 2007/0033165 A1 | 2/2007 | Sheinwald et al. |
| 2007/0073894 A1 | 3/2007 | Erickson et al. |
| 2007/0088686 A1 | 4/2007 | Hurst-Hiller |
| 2007/0106876 A1 | 5/2007 | Goswai |
| 2007/0156677 A1 | 7/2007 | Szabo |
| 2007/0162481 A1* | 7/2007 | Millett | G06F 16/31 |
| 2007/0175674 A1 | 8/2007 | Brinson |
| 2007/0203898 A1 | 8/2007 | Carmona |
| 2007/0250494 A1 | 10/2007 | Peoples et al. |
| 2007/0294235 A1* | 12/2007 | Millett | G06F 16/2264 |
| 2008/0059462 A1 | 3/2008 | Millett et al. |
| 2008/0154938 A1 | 6/2008 | Slow |
| 2009/0019038 A1 | 1/2009 | Millett |
| 2009/0063454 A1 | 3/2009 | Millett |
| 2009/0063479 A1 | 3/2009 | Millett et al. |
| 2009/0064042 A1 | 3/2009 | Millett |
| 2009/0319549 A1 | 12/2009 | Millett |
| 2011/0113048 A1* | 5/2011 | Njemanze | G06F 7/02 707/755 |
| 2011/0302189 A1* | 12/2011 | Liu | G06F 16/835 707/769 |
| 2014/0074851 A1* | 3/2014 | Zhang | G06Q 30/0201 707/741 |
| 2016/0171120 A1* | 6/2016 | Buehler | G06F 16/86 707/763 |

OTHER PUBLICATIONS

Cegiowski, "Using Bloom Filters;" Apr. 8, 2004 http://www.perl.com/pub/a/2004/04/08/bloom_filters.html; 5 pages.

Manning, et al., "Foundations of Statistical Natural Language Processing," The MIT Press, Cambridge Massachusetts, May 1999; pp. 151, 158, 192-194, 377 and 532.

Mitra, et al., "An Analysis of Statistical and Syntactic Phrases"; Jun. 1997, 11 pages.

Possas, et al., "Set-Based Vector Model: An Efficient Approach for Correlation-Based Ranking", Oct. 2005, 33 pages.

Roblee, et al., "Hierarchical Bloom Filters: Accelerating Flow Queries and Analysis," Lawrence Livermore National Laboratory FloCon 2008, dated Jan. 8, 2008, 31 pages.

Gaede, et al., "Multidimensional Access Methods," ACM Computing Surveys, ACM, New York, NY, US, vol. 30, No. 2, Jun. 1, 1998, pp. 170-231.

Yu, et al., "Multi-Cube Computation," Database Systems For Advanced Applications 2001 Proceedings, Seventh International Conference on Apr. 18-21, 2001, Piscataway, N.J., USA, pp. 126-133.

Shukla, et al.,"Storage Estimation for Multidimensional Aggregates in the Presence of Hierarchies," Proceedings of the 22th International Conference on Very Large Data Bases, San Francisco, CA, USA, 1996, 10 pages.

"Hash Function, from Wikipedia," Internet Citation, Retrieved on Apr. 18, 2008 from http://en.wikipedia.org/wiki/hash_function.

U.S. Appl. No. 11/328,863, Feb. 2, 2008, Office Action.
U.S. Appl. No. 11/681,673, Dec. 29, 2008, Office Action.
U.S. Appl. No. 11/681,673, Jun. 25, 2009, Office Action.
U.S. Appl. No. 11/681,673, Oct. 5, 2009, Notice of Allowance.
U.S. Appl. No. 11/847,688, Nov. 27, 2009, Office Action.
U.S. Appl. No. 11/847,869, Jan. 8, 2010, Office Action.
U.S. Appl. No. 11/847,784, Mar. 4, 2010, Office Action.
U.S. Appl. No. 11/847,688, Apr. 1, 2010, Notice of Allowance.
U.S. Appl. No. 12/143,441, May 12, 2010, Office Action.
U.S. Appl. No. 11/847,869, May 13, 2010, Notice of Allowance.
U.S. Appl. No. 11/847,784, Aug. 19, 2010, Office Action.
U.S. Appl. No. 12/143,441, Dec. 14, 2010, Notice of Allowance.
U.S. Appl. No. 12/211,713, Jan. 12, 2011, Office Action.
U.S. Appl. No. 12/143,432, Feb. 17, 2011, Office Action.
U.S. Appl. No. 12/211,713, Apr. 8, 2011, Office Action.
U.S. Appl. No. 12/281,262, Jul. 28, 2011, Office Action.
U.S. Appl. No. 12/281,262, Nov. 25, 2011, Notice of Allowance.
U.S. Appl. No. 11/847,784, Dec. 6, 2011, Office Action.
U.S. Appl. No. 13/052,399, Mar. 12, 2012, Office Action.
U.S. Appl. No. 13/312,022, May 14, 2012, Office Action.
U.S. Appl. No. 11/847,784, Jun. 22, 2012, Notice of Allowance.
U.S. Appl. No. 13/052,399, Aug. 14, 2012, Notice of Allowance.
U.S. Appl. No. 13/312,022, Oct. 26, 2012, Office Action.

* cited by examiner

STRUCTURED DOCUMENT INDEXING AND SEARCHING

CROSS-REFERENCE TO RELATED APPLICATIONS

This application claims priority to U.S. Provisional Application 62/342,072, titled Structured Document Indexing and Searching, filed on May 26, 2016, which application is incorporated herein by reference in its entirety.

BACKGROUND AND RELEVANT ART

Computers and computing systems have affected nearly every aspect of modern living. Computers are generally involved in work, recreation, healthcare, transportation, entertainment, household management, etc.

Computing systems are particularly useful for the creation and manipulation of data. For example, data can be stored in databases. Many computer systems store data in structured data structures. Such structured data structures are hierarchical data structures used for storing and organizing data. One example of such structured data structures includes xml data structures.

Searching and retrieving data from xml data structures can be difficult due to the nature of how xml data structures are accessed. In particular, searching an xml data structure may require a large amount of data parsing and data processing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is a method that may be practiced in a data storage environment. The method includes acts for searching for data contained in a structured data structure. The method includes receiving a query. The query includes a structured data structure path and a first element related to the structured data structure path. One or more patterns are created comprising at least a portion of the structured data structure path and one or more elements related to the first element. For each of the one or more patterns, a hash is created. The created hashes are looked-up in a hash index to identity one or more structured data structures correlated to the hashes. The one or more structured data structures are identified to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein can use a specialized index to make structured data structure searches much more efficient. In particular, Embodiments can use a compact index that is able to index structured data paths combined with data in a structured data path such that embodiments can quickly and efficiently identify particular structured data structures of interest. In particular, an improved computing system can be implemented by implementing embodiments of the invention illustrated herein. This can be accomplished by implementing a data indexing system capable of creating the compact index and a data retrieval system capable of greatly improved functionality over other systems, in that the data retrieval system can access data faster and using less computing resources than previous systems. Thus, a more efficient system can be implemented using the functionality illustrated herein.

Figure 1:
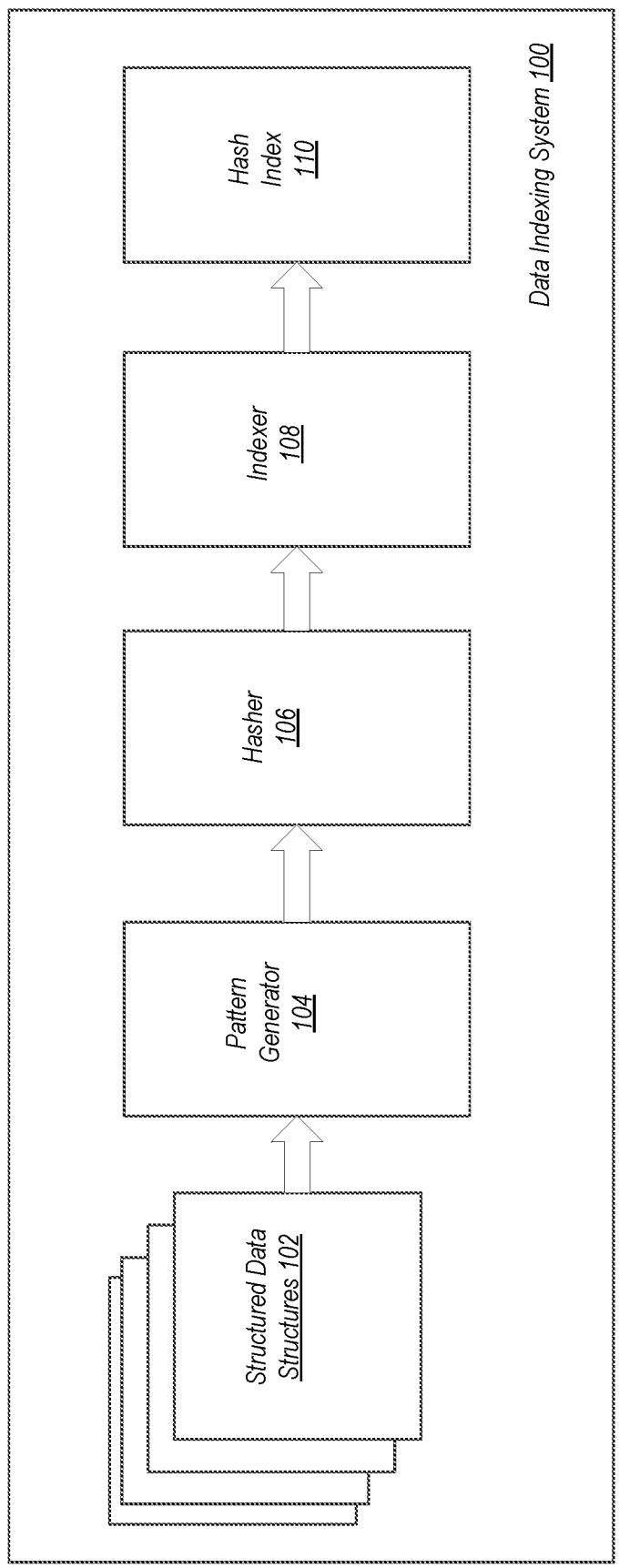
FIG. 1 illustrates a data indexing system.

Referring now to FIG. 1, an example is illustrated. FIG. 1 illustrates a data indexing system 100 which accesses a set of structured data structures 102. These data structures 102 may be internal to the data indexing system 100 as shown in FIG. 1, or external to the data indexing system 100. The structured data structures 102 contain data formatted in a structured data format, such as is common in xml documents.

FIG. 1 illustrates that the structured data structures 102 are provided to a pattern generator 104. The pattern generator 104 will generate various patterns using structured data paths and data from the structured data structures 102. Various examples of this will be illustrated below. However, for clarity, one example may be an xml data path which can be followed down to a data element. One pattern that may be generated includes the xml data path along with the particular data element. However, other patterns may alternatively or additionally be generated such as the data path along with a synonym of the particular data element, or an alternative spelling of the particular data element, or other related element to the particular data element that can be navigated to using the data path. In some embodiments, the pattern generator 104 will generate multiple patterns for a given data path/element combination. This will be illustrated in more detail below.

FIG. 1 further illustrates a hasher 106. The hasher 106 is configured to generate a hash for each of the patterns generated by the pattern generator 104.

FIG. 1 further illustrates an indexer 108. The indexer is configured to index the hashes generated by the hasher 106 with the appropriate structured data structures 102. Thus for example, if the pattern generator 104 generates a pattern from the particular structured data structure, and the hasher 106 computes a hash of that pattern, then the indexer 108 will index the computed hash correlated with the particular structured data structure in the hash index 110.

Thus, this generally results in several index entries in the hash index 110 for each data path/element combination.

A hash index 110 can be used to quickly and efficiently identify structured data structures from among the set of structured data structures 102 that contain a particular element in a particular data path in a structured data structure. Note that as used herein, and element may be a traditional data element occurring in the structured data paths. Alternatively or additionally, an element may be portion of data, and could potentially be unstructured data. For example, consider a case where a data path navigates to a transcription tag in an xml document. The transcription tag element may be a large amount of unstructured transcribed data. However, as used herein, an element may include one or more words from the transcription in the transcription tag. Thus, in this particular example, the pattern may include the path to the transcription tag along with one or more words contained in the transcription tag even though the words are included as part of the unstructured text in the transcription tag.

Figure 2:
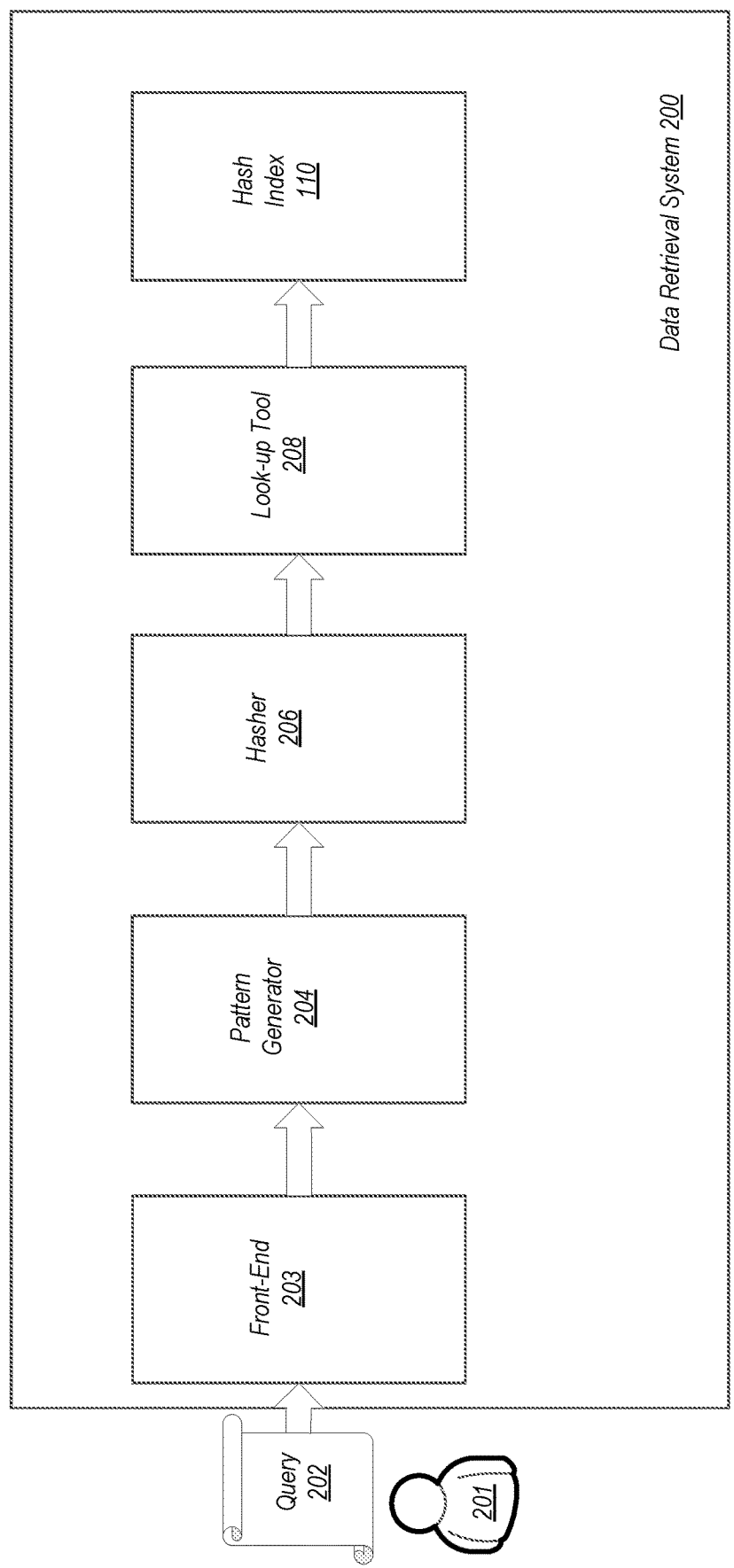
FIG. 2 illustrates a data retrieval system.

Referring now to FIG. 2, an example of using the hash index 110 to quickly retrieve structured data structures that include certain paths and elements is illustrated. In particular, the data retrieval system 200 receives a query 202 at a front-end 203 of the retrieval system 200. The front-end 203 passes the query to a pattern generator 204. In some embodiments, the pattern generator 204 can be eliminated and the query 202 can be passed directly to the hasher 206. For example, the query 202 may include the data path and one or more elements. This data path and element(s) can be hashed by the hasher 206. This hash is passed to the lookup tool 208. The lookup tool 208 can attempt to locate the hash in the hash index 110. As noted previously, the hash index 110 indexes hashes of generated patterns to structured data structures such as those included in the structured data structures 102. If the lookup tool 208 is able to match a hash of the query 202 with an entry in the hash index 110, the lookup tool can return to the front-end 203 the results from the hash index 110 identifying particular structured data structures that include data that matches the query 202. The front-end 203 can then return the results to a user 201, for example, at a machine used by the user 201 to generate and send the query 202.

The following now illustrates additional details. Note that while XML is shown, it should be appreciated that other structured data could be used in a similar fashion.

As the mixture of document and data base information has become integrated by using structured data structures, such as the Extensible Markup Language (XML) document format, an important frontier has been how to efficiently search collections of such flexible information rich documents. Enhancements are described herein that can enable rapid and scalable searching using XPath query or similar language that typically are implemented via slow scanned searching of individual structures, such as individual XML documents.

Instead of spreading information across data base records in multiple tables, structured and unstructured information is being integrated into documents. These documents include hierarchical XML tagged text, variables and values plus structured information about that data. Various tools including natural language processing and expert systems can enhance the value of the structured/unstructured information mixture making the XML/text combination less ambiguous, more information rich and more valuable to search.

Embodiments herein may include enhancements to the indexing and searching processes illustrated in U.S. Pat. No. 8,745,035 titled "Multistage Pipeline For Feeding Joined Tables To A Search System", U.S. Pat. No. 8,392,426 titled "Indexing And Filtering Using Composite Data Stores", U.S. Pat. No. 8,266,152 titled "Hashed Indexing", U.S. Pat. No. 8,190,597 titled "Multistage Pipeline For Feeding Joined Tables To A Search System", U.S. Pat. No. 8,176,052 titled "Hyperspace Index", U.S. Pat. No. 8,032,495 titled "Index Compression", U.S. Pat. No. 7,912,840 titled "Indexing And Filtering Using Composite Data Stores", U.S. Pat. No. 7,774,353 titled "Search Templates", U.S. Pat. No. 7,774,347 titled "Vortex Searching", And U.S. Pat. No. 7,644,082 titled "Abbreviated Index, which are incorporated herein by reference in their entireties, controlled by a very flexible parse table control structure to enhance XML searching. These index entries with several collections of search acceleration keys enable rapid XPath or other XML searching queries that typically require scan searching of data bases full of XML documents.

Adding Patterns to Text and Variable Information to Include XML Tags with their Domains By default, index keys are created for text and variable information in a document. For example, using the sample patient record highlighting patient identifiers used for multiple patient identifier (MPI) information records within an XML document.

This is an example of an XML template structure that would be used to generate a standardized set of documents using a limited set of XML tags and hierarchies. Such a system could have variations and different versions indicating updates and improvements to the XML template definitions in ongoing use and development or events like merging divisions or new companies into a single unified template within an organization.

Here is an example of a first section for patient name information.

```
<Patient xmlns="http://hl7.org/fhir">
  <id value="1.MPID" />
  <contained>
    <Patient>
      <id value="2222.NPI" />
      <name>
        <family value="lewis"/>
        <given value="michael">
        <given value="ivan"/>
        <suffix value="jr" />
      </name>
      ...
    </Patient>
```

Independent of the XML context, in some embodiments, these patterns are created and added to the hash index 110 when processing the word "lewis" zeroing in on the text itself in the document:

Keyword: "lewis"
Exact Phrase: "lewis michael"
Exact Phrase: "lewis michael ivan"
Content Phrase: "lewis michael"
Content Phrase: "ivan lewis michael"

Following up the XML hierarchy, many patterns can be created for the hash index.

When the "family xml tag is processed at the end of the tag ("/>"), the following pattern could be created. Phonetic and other related text patterns could also be created.

Keyword: "lewis" xml:"family"
Or: Keyword: "family:lewis"

When the name xml tag is processed at the </name> end tag, the following patterns can be created again at the word "lewis" in this first section of the <patient> tag. This XML tag is one level up from "family" and could be in one long string for the index access. The XML index entries can also be binary strings because of the more exact requirements that can be placed on the format of the text and data within the XML context. The XML tags that are to be made into these complete strings index entries would be declared in the parse table and include wildcarding of the XML tags.

Keyword: "lewis" xml:"name"
Exact Phrase: "lewis michael" xml:"name"
Exact Phrase: "lewis michael ivan" xml:"name"
Content Phrase: "lewis michael" xml:"name"
Content Phrase: "ivan lewis michael" xml:"name"
Binary with underscore separator lowercase: "lewis_michael_ivan_jr"
Other options for binary patterns:
Binary with space separator lowercase: "lewis michael ivan jr"
Binary with space separator original case with "," separator after <family>:
"Lewis, Michael Ivan Jr"

Similar sets of patterns can be created starting at "michael," "ivan" and "jr." The binary pattern would apply for the data within the domain of the tag "name" and only one pattern would be created, unlike the exact phrase patterns that move across the four words of data. These binary patterns would be very useful in checking for various versions of the name associated with the particular patient record.

As embodiments continue processing the XML hierarchy, sets of patterns will be created with the <Patient> tag, and the <contained> tag as the ending XML tag is hit covering the information within the domain of the tag.

The next <Patient> record with <id value="2222.PI"> is now processed with several <identifier> tags at the sibling level.

```
<Patient><id value="2222.PI"/>
<identifier>
  <type>
    <coding>
      <system value="http://hl7.org/fhir/v2/0203"/>
      <code value="SS"/>
      <display value="Social Security number"/>
    </coding>
  </type>
  <system value="http://hl7.org/fhir/sid/us-ssn"/>
  <value value="000000001"/>
</identifier>
```

In this XML for master patient identifier systems, the details of the Master Patient Identifier use this particular template of XML with <identifier> tags giving more information about the ID in the original <patient> record without the subtag <identifier>.

Planned Key Explosion on Data and Text Side

The index 110 may already be under expansion pressure independent of the XML paths where the data is contained within. Indexing including grammatical forms, longer exact and content word phrases, capitalization retention patterns, misspelling autocorrection processing, plus other natural language and other processing that can improve the semantic accuracy of the search contribute to the expansion of the index 110.

Patterns may be multiplied by several times as a result of adding additional patterns including XML path additions and combinations. For example, a typical fully indexed system today has a 100% overhead of the index. That is, the index is the same size as the actual data being indexed. Assume extra patterns may increase that to 300% overhead. Then, if all paths and combinations of XML pieces are used with a complex XML hierarchy structure, there might be a 20× or even 50× or 100× increase index size, giving as high as 10,000% index overhead. Thus, some embodiments may implement at the pattern generator 104, careful use of the XML patterns selection and creation criteria which might result in, for example, 1,500% index overhead. Thus, for example, in this case, there would be 15 TB of index for 1 TB of data, which would be a reasonable index size that could be implemented.

This underlines the importance of careful XML path selection criteria and processing to give good XML context information in the index for XPath searching without overly expanding the index size as would happen with all combinations of all XML path lengths in the index and contexts of the path information being included. The expert system and assembly and subassembly indexing would be even a worse index size example in the unlimited case.

Kinds of XML Path Subsets that Guide Indexing and Searching

Even though implemented embodiments of the index 110 can handle billions and even trillions of unique non-duplicate 128 bit hashed keys, if all combinations of XML path keys are indexed, complete paths (e.g., partial paths, ordered contiguous paths, differing versions and orderings of XML tag templates, etc.) the resulting explosion of keys for the index 110 may overload the indexing capabilities. Thus, embodiments selectively index various parts of the complete XML path subsets that limit the explosion while being able to avoid complete scan searches and give keys that add seemingly nearly instantaneous searching to XPath searching.

To limit the proliferation of hashed keys for the index 110, embodiments can categorize various subsets of XML paths in a template that are worth indexing which can result in useful search results but help limit the generation of duplicate or less useful key creation.

Here are some of the possible XML path subsets, which to include would be specified in the parse table structure.

1. Full path:   /Patient/contained/Patient/name/family
2. N-XML adjacent tags in subpath:   contained/Patient, type/coding/code
3. Discontinuous path elements:   contained/*/name
4. Lowest level XML tag:   family
5. XML that is ignored by itself, or is invisible:   contained
6. XML that is invisible and also breaks exact phrase and other patterns:
   Example: Paragraph: <P></P>

Example of Invisible Tag

A good example of an XML tag that could be excluded and not be used to make any additional sets of patterns is the <contained> tag for this template set for the multiple ID XML specification. <contained> includes the whole record and the individual information within its domains will have already been made into the basic data patterns plus additional patterns for the next levels of XML tags. This XML tag is typical of a container tag that in turn has several subtags indicating one or more subrecords in the container tag, in this case the <patient> tag that may occur multiple times. Invisible tags can be detected in many instances if the data part of the pattern is identical for a tag and its parent tag (e.g. type/coding/code above).

Example of Invisible Plus Exact Phrase Break

The paragraph tag is a good example of an invisible tag that limits the overlap of phrase words between sections of text. This avoids generating phrases that really are not indicated in the text or that make sense as a phrase. Embodiments may already generate text patterns for the text within the paragraph so it is invisible in the sense of not creating patterns specific to the paragraph tag.

Here is an example of two paragraphs and the exact phrase patterns that are generated at the boundary between the two paragraphs.

<P> The Lord is my shepherd; I shall not want. <//P>
<P> He maketh me to lie down in green pastures: he leadeth me beside the still waters. </P>

Exact Phrase and keyword Patterns at boundary:
"I shall not" "shall not want" "not want" "want"
"he maketh me" "maketh me to"

Abbreviated Path Information

The full path designation may become very long and more difficult to specify a valid search. Making the path elements of limited length can simplify the final keys. This may be particularly useful when verbose or dictionary kinds of definitional language for the XML tags are being used rather than shorter, more abbreviated forms.

For example, consider XML that contains parts and their relationships within a subassembly of a Boeing Jetliner.

To be able to search specifically for a fairly common bolt used inside the auxiliary power unit in the tail of most modern jets. An abbreviated version of the path might be/B737/fuselage/tail_section/APU/controls/bolts/bolt_635. Expanding the APU fragment of the path to auxiliary_power_unit as well as other tags could be quite a long string. Using a limiting length of 12 letters per level could replace auxiliary_power_unit to axiliary_po* still assisting the search but less verbose.

An example of criteria for selecting subsets of the path through the part and assembly explosion is a modified path in this example. B737/fuselage/tail_section/APU/*/bolt_635. The main classifications plus the subassembly entry point and terminal nodes like the bolt are XML levels that might be sufficient for indexing and searching without exploding the size of the index too much.

Note that in the part and assembly application of XML paths in this example, the large number of possible path and subpath patterns become very evident. Thus, it may be advantageous to implement functionality to limit the number of patterns.

Efficient Search for a Variety of Hierarchical Structures

The mixture of hierarchies and text indexed efficiently with a system such as one that includes a hash index 110 can integrate structured, semantically disambiguated data with the advantages of full text with all of its ambiguity and nuances.

Figure 3:
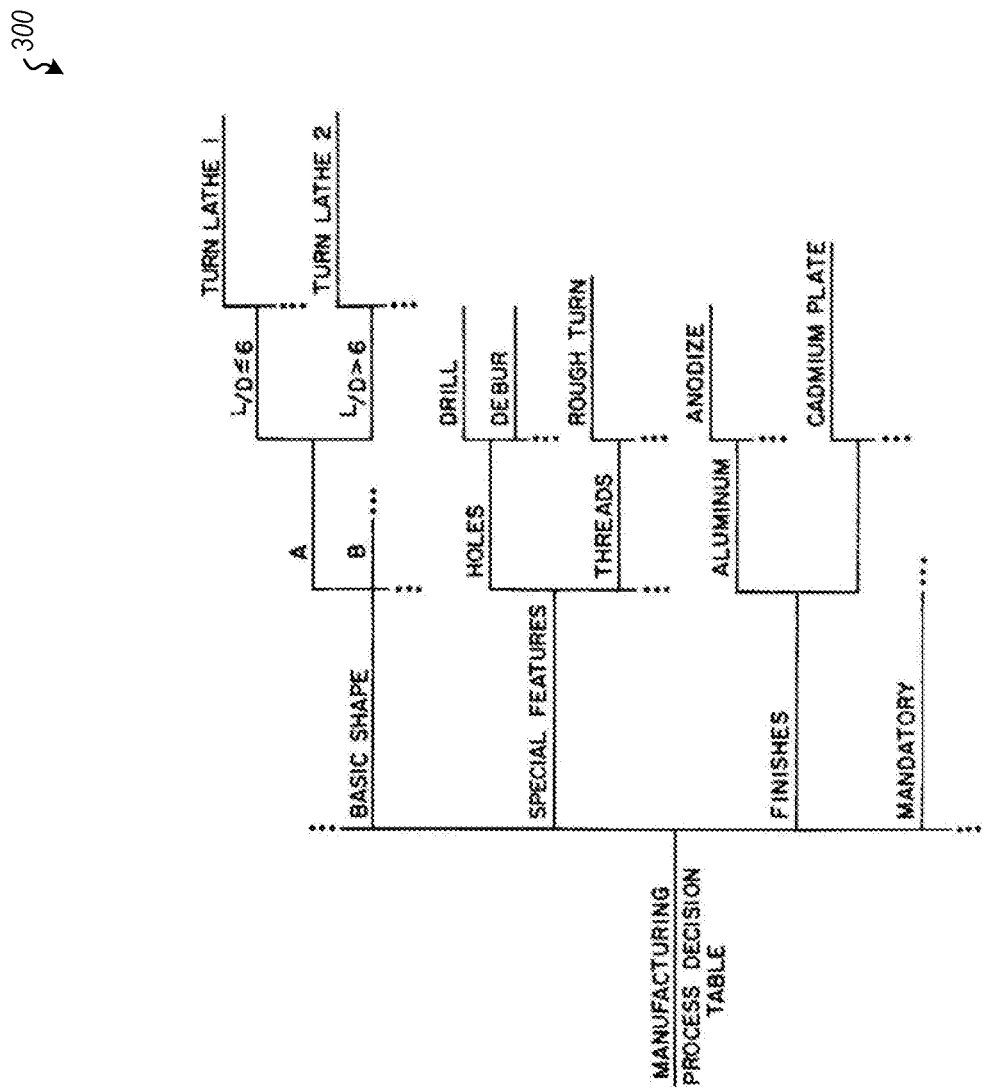
FIG. 3 illustrates a structured data structure.

Not only could this system work for engineering hierarchies for airplanes, but even the complex hierarchies of expert system logic can also be searched efficiently. FIG. 3 illustrates a decision tree 300 used for advanced logic for manufacturing process planning. The following illustrates how text and logic could also be indexed and searched.

For example, "Basic Shape" operations containing a "turn lathe 2" processing operation could be searched using hierarchies illustrated in FIG. 3 and indexed as described previously herein. Embodiments could be used to index defined subhierarchies and subtrees of expert system logic that would involve many subtrees and hundreds of levels of decision tree logic that in turn could link to other hierarchies of logic. Once again, it may be useful, depending on the hierarchy and resources available for indexing to limit the hierarchy+data index from handling every path and every combination of tags together within that path.

For example, embodiments may only index patterns for manual nodes, or only create index patterns for automatic nodes. Alternatively or additionally, embodiments may only create index patterns for the top nodes in hierarchal subtrees and/or the terminal nodes.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
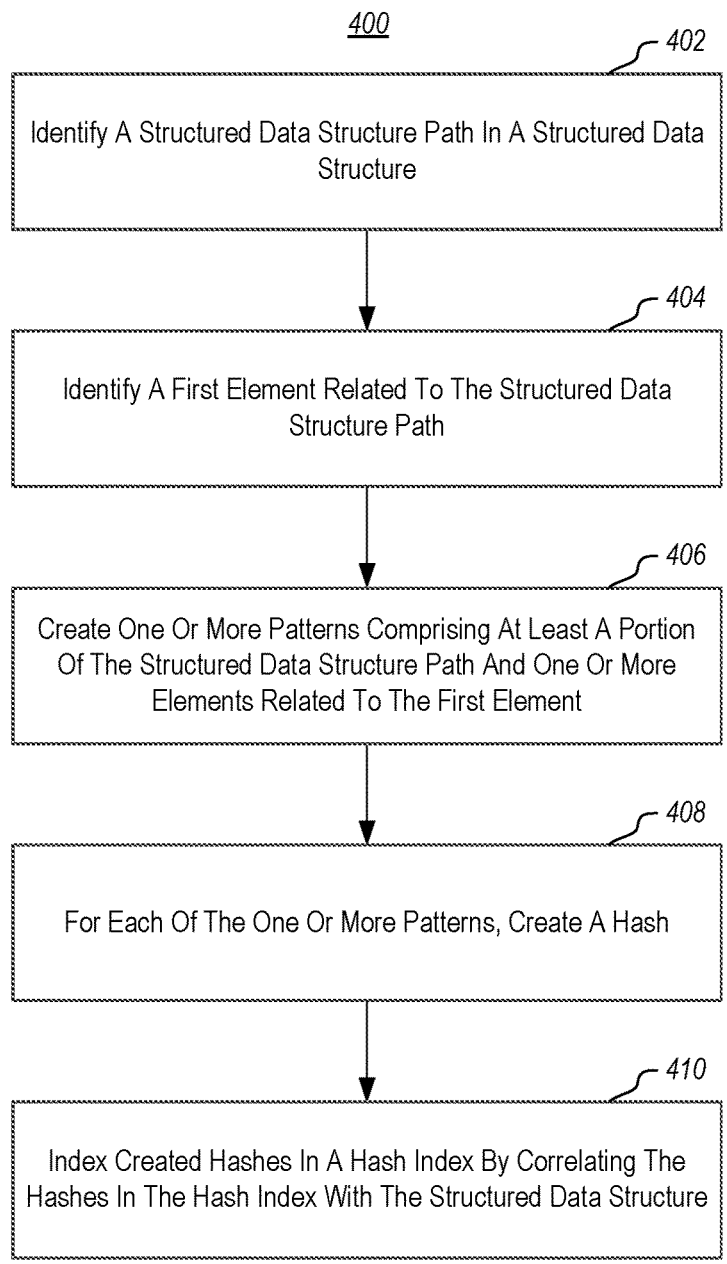
FIG. 4 illustrates a method of indexing data.

Referring now to FIG. 4, a method 400 is illustrated. In the illustrated example, the method 400 may be practiced in a data storage environment. The method includes acts for indexing data contained in a structured data structure.

The method 400 includes identifying a structured data structure path in a structured data structure (act 402).

The method 400 further includes identifying a first element related to the structured data structure path (act 404).

The method 400 further includes creating one or more patterns comprising at least a portion of the structured data structure path and one or more elements related to the first element (act 406).

The method 400 further includes for each of the one or more patterns, creating a hash (act 408).

The method 400 further includes indexing created hashes in a hash index by correlating the hashes in the hash index with the structured data structure (act 410).

The method 400 may be practiced where the structured data structure comprises an XML document.

The method 400 may be practiced where the structured data structure comprises a decision tree.

The method 400 may be practiced where the structured data structure is a JSON document.

The method 400 may be practiced where the structured data structure is an XML document.

The method 400 may be practiced where the first element comprises one or more structured data elements.

The method 400 may be practiced where the first element comprises one or more unstructured data elements (e.g., words from free form text) contained in the structured data structure.

Figure 5:
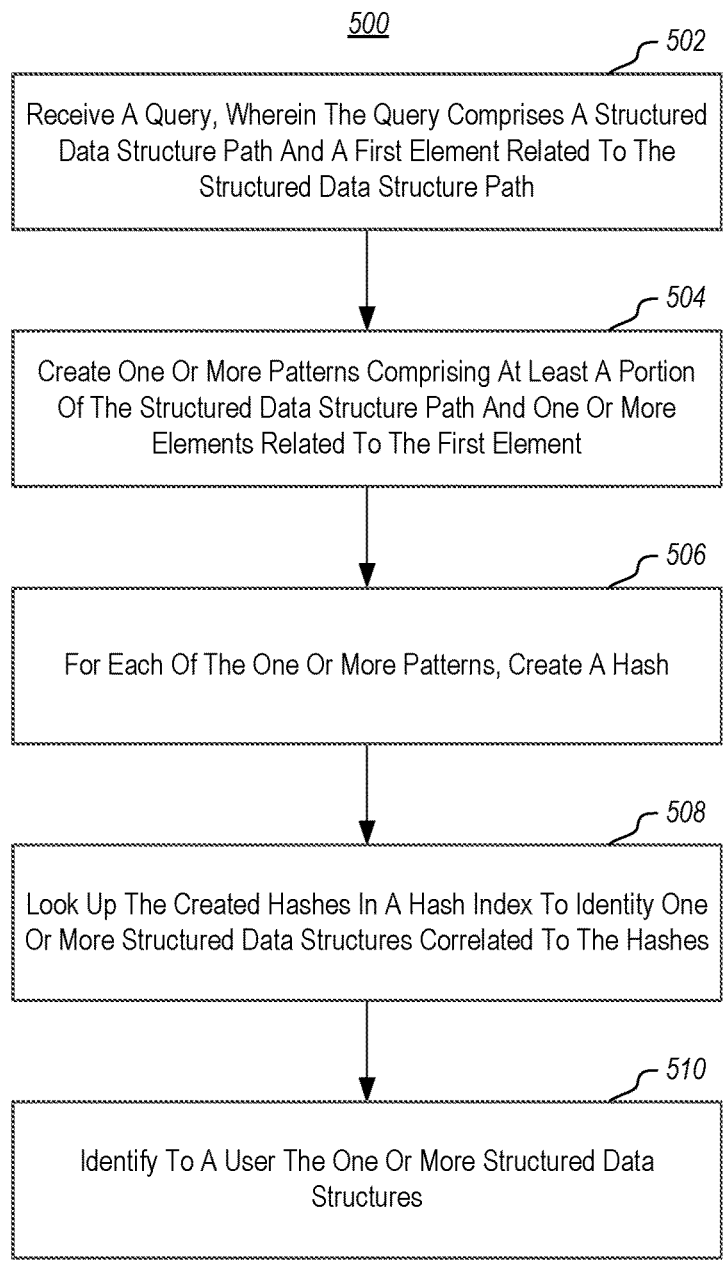
FIG. 5 illustrates a method of retrieving data.

Referring now to FIG. 5 a method 500 is illustrated. The method 500 may be practiced in a data storage environment. The method 500 includes acts for searching for data contained in a structured data structure.

The method 500 includes receiving a query, wherein the query comprises a structured data structure path and a first element related to the structured data structure path (act 502).

The method 500 further includes creating one or more patterns comprising at least a portion of the structured data structure path and one or more elements related to the first element (act 504).

The method 500 further includes for each of the one or more patterns, creating a hash (act 506). and The method 500 further includes looking up the created hashes in a hash index to identity one or more structured data structures correlated to the hashes (act 508).

The method 500 further includes identifying to a user the one or more structured data structures (act 502).

The method 500 may further include providing a confidence level indicating a confidence that the one or more structured data structures match the query. For example, the confidence level is based on how similar the one or more related elements are to the first element.

Embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for indexing data contained in a structured data structure, the system comprising:
   at least one processor; and
   at least one computer readable medium coupled to the processor comprising computer executable instructions that when executed by the processor implement:
   a pattern generator, wherein the pattern generator is configured to:
   identify a structured data structure path in a structured data structure comprising a plurality of data elements;
   identify a first data element wherein the structured data structure path is followed to the first data element, the first data element comprising one or more unstructured data elements contained in the structured data structure;
   create one or more patterns comprising at least a portion of the structured data structure path combined with one or more elements related to the first element such that at least one of the patterns comprises the structured data structure path and unstructured data;

a hasher configured to, for each of the one or more patterns, including at least one pattern that includes an unstructured data element related to the first data element and at least a portion of the structured data structure path, create a hash, including creating a hash for the at least one pattern comprising both the structured data structure path and unstructured data; and an indexer configured to index created hashes in a hash index by correlating the hashes in the hash index with the structured data structure, including indexing the hash created for the at least one pattern comprising both the structured data structure path and unstructured data.

2. The system of claim 1, wherein the structured data structure comprises an XML document.

3. The system of claim 1, wherein the structured data structure comprises a decision tree.

4. The system of claim 1, wherein the structured data structure is a JSON document.

5. A system for searching for data contained in a structured data structure, the system comprising:
at least one processor; and
at least one computer readable medium coupled to the processor comprising computer executable instructions that when executed by the processor implement:
a front-end configured to receive a query, wherein the query comprises a structured data structure path and a first data element wherein the structured data structure path is followed to the first data element, the first data element comprising one or more unstructured data elements contained in the structured data structure;
a pattern generator configured to create one or more patterns comprising at least a portion of the structured data structure path combined with one or more elements related to the first element such that at least one of the patterns comprises the structured data structure path and unstructured data;
a hasher configured to, for each of the one or more patterns, including at least one pattern that includes an unstructured data element related to the first data element and at least a portion of the structured data structure path, create a hash, including creating a hash for a pattern comprising both the structured data structure path and unstructured data;
a look-up tool configured to look up the created hashes in a hash index to identity one or more structured data structures, each data structure in the plurality of data structures comprising a plurality of data elements, correlated to the hashes, wherein the hash index indexes the hash created for the pattern comprising both the structured data structure path and unstructured data; and
wherein the front end is configured to identify to a user the one or more structured data structures.

6. The system of claim 5, wherein the front end is configured to provide a confidence level indicating a confidence that the one or more structured data structures match the query.

7. The system of claim 6, wherein the confidence level is based on how similar the element related to the first data element is to the first data element.

8. In a data storage environment, a method of indexing data contained in a structured data structure, the method comprising:
identifying a structured data structure path in a structured data structure comprising a plurality of data elements;
identifying a first unstructured data element wherein the structured data structure path can be followed to the first data element, the first data element comprising one or more unstructured data elements contained in the structured data structure;
creating one or more patterns comprising at least a portion of the structured data structure path combined with the first data element such that at least one of the patterns comprises the structured data structure path and unstructured data;
for each of the one or more patterns, including portions of the patterns that include at least a portion of the structured data structure path and the first unstructured data element, creating a hash, including creating a hash for the at least one pattern comprising both the structured data structure path and unstructured data; and
indexing created hashes in a hash index by correlating the hashes in the hash index with the structured data structure, including indexing the hash created for the at least one pattern including both the structured data structure path and unstructured data.

9. The method of claim 8, wherein the structured data structure comprises an XML document.

10. The method of claim 8, wherein the structured data structure comprises a decision tree.

11. The method of claim 8, wherein the structured data structure is a JSON document.

12. In a data storage environment, a method of searching for data contained in a structured data structure, the method comprising:
receiving a query, wherein the query comprises a structured data structure path and a first data element wherein the structured data structure path is followed to the first data element;
creating one or more patterns comprising at least a portion of the structured data structure path combined with the first data element;
for each of the one or more patterns, including at least one pattern that includes at least a portion of the structured data structure path and the first data element, creating a hash, including creating a hash for a pattern comprising both the structured data structure path and unstructured data; and
looking up the created hashes in a hash index to identity one or more structured data structure paths, each data structure path in the one or more structured data structure paths being indexed in the hash index with unstructured data elements by the one or more structured data structure paths being hashed in patterns including the one or more structured data structure paths and unstructured data that can be reached by following the one or more structured data structure paths, the hash index indexes the hash for the pattern comprising both the structured data structure path and unstructured data; and
identifying to a user the one or more structured data structure paths.

13. The method of claim 12, further comprising providing a confidence level indicating a confidence that the structured data structure matches the query.

14. The method of claim 12, wherein the query comprises an XPath query.

* * * * *